Patented Oct. 9, 1945

2,386,700

UNITED STATES PATENT OFFICE 2,386,700

COATED PAPER

Frank H. Manchester, Akron, Ohio, assignor to Wingfoot Corporation, Akron, Ohio, a corporation of Delaware No Drawing. Application November 20, 1943, Serial No. 511,173

2 Claims. (Cl. 117—155)

This invention relates to paper which is coated with a composition which comprises rubber hydrochloride and a benzene-soluble copolymer of vinyl chloride and vinylidene chloride. It has been recognized that the copolymer has high resistance to the transfer of moisture vapor, but solutions of the copolymer have such low viscosity that they penetrate paper so rapidly that they cannot be used alone for coating. According to this invention, rubber hydrochloride is added to the coating solution to increase its viscosity so that when applied to paper, no more than surface impregnation of the paper results.

Coating compositions which contain rubber hydrochloride as the only film-forming ingredient shrink so much on evaporation of the solvent that they cause the paper, foil, etc., to which they are applied to wrinkle and pucker. Addition of the copolymer eliminates such wrinkling and puckering. Furthermore, the mixture has almost no tendency to blister, a characteristic of coatings which contain only the copolymer.

The copolymer employed is the benzene-soluble copolymer. It contains at least 40 or 45 per cent and not more than 70 or 75 per cent of vinylidene chloride with the balance vinyl chloride. It may, for example, contain equal parts of the monomers. A preferred form is the soluble-type Saran manufactured by Dow Chemical Company, of Midland, Michigan, as Saran B-130. Plasticizers, dyes, pigments, etc., and fillers may be added to the coating composition as desired.

Tests on self-supporting films of the mixture of rubber hydrochloride and the copolymer show that increasing the rubber hydrochloride content and decreasing the copolymer content decreases the resistance to moisture-vapor transfer but increases the tear resistance of the composition. Therefore, when thin coatings of high moisture-vapor resistance are required, a high copolymer content may be desired, particularly where the coated surfaces are to be bonded together. The increase in the tear resistance is of little or no consequence when the composition is applied as a coating. The addition of the copolymer to the rubber hydrochloride in amounts of even less than 10 parts of the copolymer to 90 of the rubber hydrochloride improves the uniformity of the heat-sealing properties of the coating. Therefore, the addition of even as little as 5 per cent of the copolymer is desirable, and when high moisture resistance is required, even as little as 5 per cent of the rubber hydrochloride gives an increase in the viscosity which prevents the solution of the coating from striking through the paper to the extent which it does without any of the copolymer.

Although the rubber hydrochloride and copolymer are compatible in all proportions, 10 parts of the rubber hydrochloride to 90 parts of the copolymer will produce a coating preferred for many purposes. Heating increases the solubility of the rubber hydrochloride and also the copolymer and decreases the viscosity of the rubber hydrochloride and has been found advantageous in the preparation of coatings to be applied at an elevated temperature. A solution of 30 per cent solids content containing, for example, 10 per cent of the rubber hydrochloride and 90 per cent of the copolymer may advantageously be used for coating when heated to a temperature of 140–160° F. Such a coating solution may contain from 5 to 25 parts of the rubber hydrochloride to 95 to 75 parts of the copolymer.

The following table illustrates the effect of different compositions on Esleek "clear copy" onion skin. Light coats of the mixtures do not curl. The copolymer used in preparing the samples was Saran B-130, and the rubber hydrochloride was a solution of Pliofilm manufactured by The Goodyear Tire & Rubber Company.

| Coating material | Weight of coating | Appearance and remarks |
|---|---|---|
| Pliofilm | Heavy coat | Very glossy—shrinks and curls badly. |
| Saran | do | Blistered badly—curls slightly. Thin spots struck in. Slight gloss. |
| Blend: 95 Saran, 5 Pliofilm | Medium to heavy coat | Medium coat has fair gloss. Heavy coat blisters less than Saran. Slight curling. |
| Blend: 80 Saran, 20 Pliofilm | do | Good gloss, slight blistering. Medium curling. |
| Blend: 50 Saran, 50 Pliofilm | do | Fair gloss. Some bridging in heavy coat. Some curling. |
| Blend: 50 Saran, 50 Pliofilm | Thin coat | Fair gloss—no curling. |
| Blend: 10 Saran, 90 Pliofilm | Medium to heavy coat | Good gloss—slight lifting. Strong curling. |
| Bend: 95 Saran, 5 Pliofilm | Light coat | Fair gloss—no blistering—no curling. |

The papers to which the coating may be applied include the cellulosic papers, including such treated papers as glassine, etc., and non-cellulosic, so-called papers, such as metal foils, rubber hydrochloride, casein, etc. Films composed essentially of rubber hydrochloric and the copolymer used herein are described and claimed in application Serial No. 502,931 of Joseph P. Maider, filed September 18, 1943.

What I claim is:

1. Paper coated with a mixture composed essentially of rubber hydrochloride and a benzene-soluble copolymer of vinyl chloride and vinylidene chloride and containing 5 to 95 parts of the rubber hydrochloride and 5 to 95 parts of the copolymer, the copolymer being formed from about 45 to 70 parts of vinylidene chloride and 30 to 55 parts of vinyl chloride.

2. The method of coating paper which comprises applying thereto a benzene solution of a mixture composed essentially of rubber hydrochloride and a benzene-soluble copolymer of vinyl chloride and vinylidene chloride at a temperature of 125–160° F., which mixture contains 5 to 95 parts of the rubber hydrochloride and 5 to 95 parts of the copolymer, the copolymer being formed from about 45 to 70 parts of vinylidene chloride and 30 to 55 parts of vinyl chloride.

FRANK H. MANCHESTER.